US010852743B2

(12) United States Patent
Creusot et al.

(10) Patent No.: US 10,852,743 B2
(45) Date of Patent: Dec. 1, 2020

(54) MULTIMODAL MULTI-TECHNIQUE SIGNAL FUSION SYSTEM FOR AUTONOMOUS VEHICLE

(71) Applicant: GM GLOBAL TECHNOLOGY OPERATIONS LLC, Detroit, MI (US)

(72) Inventors: Clement Creusot, San Francisco, CA (US); Sarthak Sahu, Palo Alto, CA (US); Matthais Wisniowski, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 16/124,239

(22) Filed: Sep. 7, 2018

(65) Prior Publication Data
US 2020/0081450 A1    Mar. 12, 2020

(51) Int. Cl.
| G05D 1/02 | (2020.01) |
| G05D 1/00 | (2006.01) |
| G06K 9/00 | (2006.01) |
| G06K 9/62 | (2006.01) |
| G06T 7/50 | (2017.01) |

(Continued)

(52) U.S. Cl.
CPC .......... *G05D 1/0246* (2013.01); *G05D 1/0088* (2013.01); *G06K 9/00825* (2013.01); *G06K 9/6289* (2013.01); *G05D 2201/0213* (2013.01); *G06T 7/50* (2017.01); *G06T 7/90* (2017.01);

(Continued)

(58) Field of Classification Search
CPC ............... G05D 1/0246; G05D 1/0088; G05D 2201/0213; G06K 9/00825; G06K 9/6289; G06K 9/6292; G06K 9/00791; G06T 7/50; G06T 2207/20084; G06T 2207/30252; G06T 7/90; H04N 5/247; G08G 7/00; B60W 30/00
See application file for complete search history.

(56) References Cited

U.S. PATENT DOCUMENTS 9,690,297 B1 *   6/2017   Ferguson ............. G08G 1/0104
9,720,415 B2      8/2017   Levinson et al.
(Continued)

FOREIGN PATENT DOCUMENTS

WO    WO-2016012524 A1 *   1/2016   ........... G06K 9/6288

OTHER PUBLICATIONS

Machine Translation of WO2016012524A1 retrieved from espacenet on Jun. 7, 2020 (Year: 2016).*

(Continued)

*Primary Examiner* — Thomas Ingram
(74) *Attorney, Agent, or Firm* — Medley, Behrens & Lewis, LLC

(57) ABSTRACT

An autonomous vehicle incorporating a multimodal multi-technique signal fusion system is described herein. The signal fusion system is configured to receive at least one sensor signal that is output by at least one sensor system (multimodal), such as at least one image sensor signal from at least one camera. The at least one sensor signal is provided to a plurality of object detector modules of different types (multi-technique), such as an absolute detector module and a relative activation detector module, that generate independent directives based on the at least one sensor signal. The independent directives are fused by a signal fusion module to output a fused directive for controlling the autonomous vehicle.

20 Claims, 7 Drawing Sheets

(51) Int. Cl.
*H04N 5/247* (2006.01)
*G06T 7/90* (2017.01)

(52) U.S. Cl.
CPC ............... *G06T 2207/20084* (2013.01); *G06T 2207/30252* (2013.01); *H04N 5/247* (2013.01)

(56) References Cited

U.S. PATENT DOCUMENTS

| | | | |
|---|---|---|---|
| 9,892,332 B1 | 2/2018 | Wendel et al. | |
| 9,990,548 B2* | 6/2018 | Wellington | G05D 1/0088 |
| 10,525,903 B2* | 1/2020 | Laur | G01S 13/867 |
| 2013/0253754 A1* | 9/2013 | Ferguson | G05D 1/0231 |
| | | | 701/28 |
| 2015/0012200 A1* | 1/2015 | Joshi | G05D 1/0276 |
| | | | 701/70 |
| 2015/0210277 A1* | 7/2015 | Ben Shalom | B60W 30/14 |
| | | | 382/104 |
| 2015/0360692 A1* | 12/2015 | Ferguson | G06K 9/00791 |
| | | | 701/23 |
| 2017/0243073 A1* | 8/2017 | Raghu | G06K 9/00818 |
| 2019/0050729 A1* | 2/2019 | Lakshmanan | G06N 3/0454 |

OTHER PUBLICATIONS

Fairfield, et al., "Traffic Light Mapping and Detection", In IEEE International Conference on Robotics and Automation (ICRA), 2011, 6 pages.

Levinson, et al., "Traffic Light Mapping, Localization, and State Detection for Autonomous Vehicles", In IEEE International Conference on Robotics and Automation (ICRA), 2011, 8 pages.

* cited by examiner

MULTIMODAL MULTI-TECHNIQUE SIGNAL FUSION SYSTEM FOR AUTONOMOUS VEHICLE

BACKGROUND

An autonomous vehicle is a motorized vehicle that can operate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Typically, sensor signals are provided to a computing system in communication with the plurality of sensor systems, wherein the sensor signals capture objects in proximity to the autonomous vehicle, such as traffic lights. The sensor signals are processed by the computing system and, based on detection of an object captured in the sensor signal, the processor executes instructions to control a mechanical system of the autonomous vehicle (e.g., a vehicle propulsion system, a braking system, or a steering system).

Detecting the configuration of an illuminated traffic light can be particularly suited for camera sensor systems. In such instances, a camera sensor system outputs a sensor signal that defines an image. An object detector module incorporated in the computing system detects the configuration of one or more illuminated bulbs in one or more traffic lights captured in the image. The detected traffic light configuration is used by the object detector module to define a directive for the autonomous vehicle. The directive may include identifying a permissive maneuver for the autonomous vehicle to perform based on the detected configuration of the traffic light.

Nevertheless, due to reliance by the computing system upon sensor signals from a camera sensor system to detect illuminated configurations of traffic lights, autonomous vehicles that comprise only one camera sensor system are subjected to a single point of failure that could result in output of an erroneous directive. For example, if the only camera sensor system of the autonomous vehicle is obscured by rain droplets or blocked by dirt, the generated sensor signal may not accurately capture the configuration of the traffic light. In addition, a computing system having only one object detector module further subjects the system to a single point of failure. That is, if the sole object detector module of the computing system incorrectly identifies the configuration of a traffic light, an undesirable directive may be output to control the autonomous vehicle.

SUMMARY

The following is a brief summary of subject matter that is described in greater detail herein. This summary is not intended to be limiting as to the scope of the claims.

Described herein are various technologies pertaining to a multimodal multi-technique signal fusion system for an autonomous vehicle. With more specificity, described herein are various technologies pertaining to fusing the outputs of a plurality of object detector modules to improve the suitability of a directive generated for controlling the autonomous vehicle, wherein the outputs are based on at least one sensor signal such as camera sensor signal. With still more specificity, described herein is a signal fusion system having a fusion module that generates a fused directive by fusing the outputs of the plurality of object detector modules, which are each configured to receive the at least one sensor signal. The outputs of the plurality of object detector modules are generated to define independent directives based on the at least one sensor signal provided to each of the plurality of object detector modules. A control system controls a mechanical system of the autonomous vehicle, such as a vehicle propulsion system, a braking system, and/or a steering system, based upon the fused directive.

The multimodal multi-technique signal fusion system can include various aspects that facilitate generation of a fused directive. First, the system can be configured to receive multiple sensor signals from a plurality of different sensor systems (i.e., multimodal). Second, the system can comprise a plurality of object detection modules including object detection modules of different types (i.e., multi-technique). Third, the system fuses the sensor signals to output a fused directive by merging outputs from the plurality of object detection modules.

In an exemplary embodiment, the plurality of different sensor systems includes a fixed exposure camera and an autoexposure camera. The fixed exposure camera may be a general-purpose camera suitable for capturing daytime images of traffic lights without overexposing the captured image. In particular, the fixed exposure camera operates as a desirable sensor system in many instances where ambient light, such as sunlight or street lights, brightens the scene to balance the intensity of emitted light from the captured traffic bulbs. In contrast, capturing an illuminated traffic light at nighttime without sufficient ambient light may generate a blurred image that is not readily discernable by the plurality of object detector modules to determine a configuration of the traffic light. In such cases, an autoexposure camera system, such as a high dynamic range (HDR) camera system, may be suitable for capturing nighttime images of traffic lights by maintaining an even exposure across a captured image on average. For instance, while the majority of the scene may be reproduced as dark or blacked out when captured by an HDR camera at nighttime, the illuminated bulbs of the traffic light will be reproduced in a discernable form without excessive blurring or halos that hinder the image proximate to the captured traffic light.

It is to be understood from the foregoing that neither fixed exposure cameras or autoexposure cameras are limited to capturing respective daytime and nighttime images, nor is any one type of camera specifically required to form a multimodal system. Importantly, it is the implementation of a signal fusion system that is configured to fuse a plurality of sensor signals (whether from fixed exposure cameras, autoexposure cameras, both, or others) that provides improved accuracy to a directive generated by the signal fusion system.

Incorporated in the signal fusion system is a plurality of object detector modules that receive sensor signals generated by the sensor systems. The plurality of object detector modules includes at least a first type of module and a second type of module to establish multiple techniques for determining the configuration of a traffic light. At least one sensor signal is provided to the plurality of object detector modules such that each module generates an independent directive/observation for fusion at the fusion module. In particular, each object detector module is configured to receive each sensor signal generated by the plurality of sensor systems. When a plurality of sensor signals is provided by the plurality of sensor systems, each object detector module likewise outputs a plurality of independent directives that correspond to a signal from the plurality of the sensor systems (e.g., fixed exposure camera, autoexposure camera, etc.). Thus, while only one sensor system is required to perform the multi-technique aspect of the signal fusion system, a plurality of (camera) sensor systems may be preferable in certain embodiments.

In an exemplary embodiment, the first type of module may be an absolute detector module and the second type of module may be a relative activation detector module. In the context of traffic light detection, an absolute detector is configured to determine a kind of bulb that is illuminated. For example, the absolute detector may use a convolution neural network to identify a circle that is green in the image and generate a directive of "GO". In contrast, a relative activation detector is configured to define a directive based on inferences about the traffic light captured in the image. For example, the relative activation detector may use a convolution neural network to determine that a bulb is illuminated in a specific location of a predefined traffic light layout and thereby infer, for example, that a green circle has been detected based on the location of the illuminated bulb in the layout to generate a directive of "GO". Accordingly, each of the first type of module and the second type of module generate independent directives based on a common sensor signal provided to each module.

The independent directives are then provided to a signal fusion module to merge the generated outputs of the first type of module and the second type of module into a fused directive using a probabilistic technique. For instance, if outputs from the plurality of the object detector modules provide conflicting information, the signal fusion module will apply a confidence score to determine which information should be incorporated into the fused directive. The fused directive defines instructions for the autonomous vehicle based on the currently detected state of the traffic light as determined by the signal fusion module and is provided to a control system of the autonomous vehicle for operation of a mechanical system thereof.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
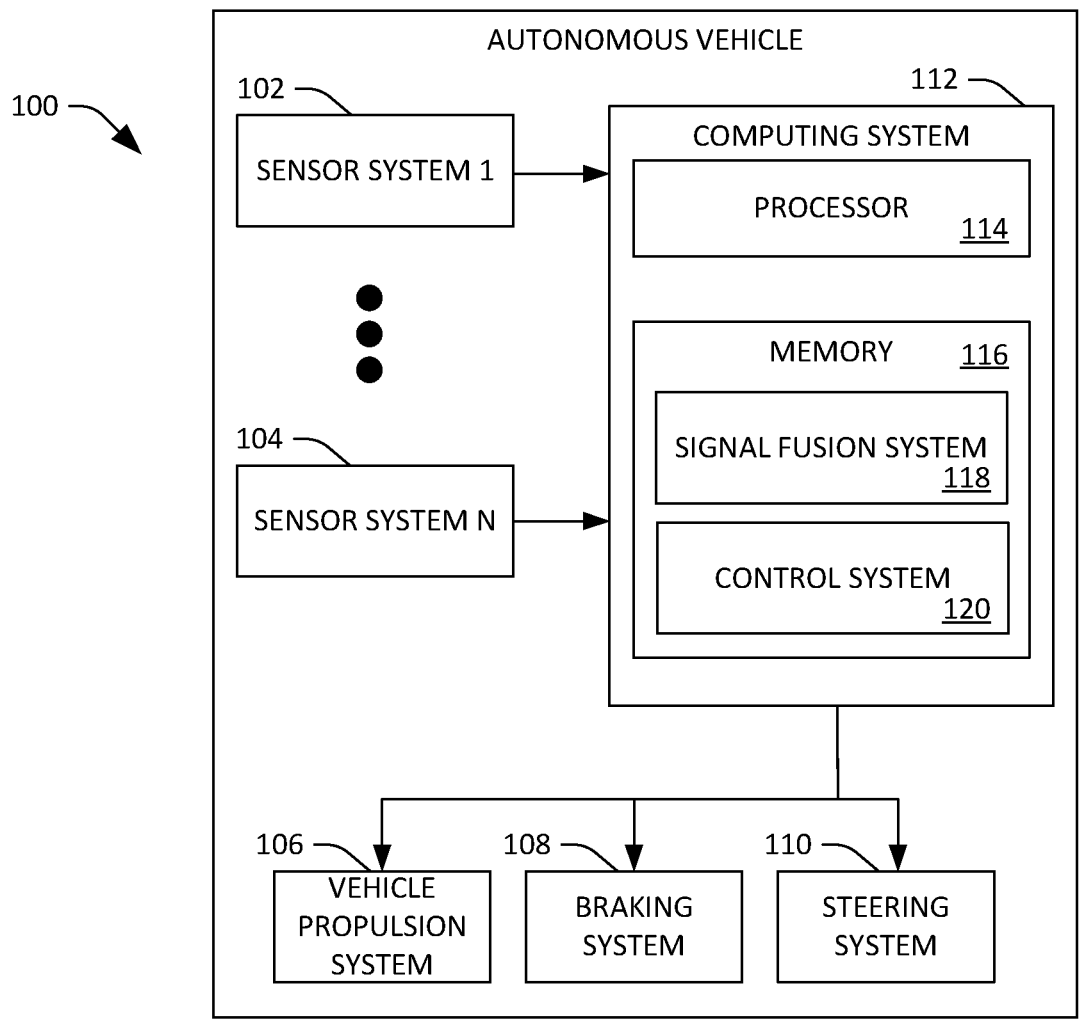
FIG. 1 illustrates an exemplary autonomous vehicle.

Various technologies pertaining to a multimodal multi-technique signal fusion system for an autonomous vehicle is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

As used herein, the term "fusion" is intended to define the merging of a plurality of outputs into a single output, for example, the merging of a plurality of sensor signals and/or the merging of a plurality of independent directives.

As used herein, the term "independent directive" refers to an instruction that is independently generated by a particular object detector from a particular sensor signal to manipulate the movement of an autonomous vehicle.

As used herein, the terms "directive" and "fused directive" refer to an instruction that is generated by fusing a plurality of independent directives to manipulate the movement of an autonomous vehicle.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a camera/image sensor system and the Nth sensor system 104 may be a lidar system; or the sensor systems 102-104 may be of different types of a particular kind of sensor system, such as different types of camera sensor systems. Other exemplary sensor systems include radar sensor systems, global positioning system (GPS) sensor systems, sonar sensor systems, infrared sensor systems, and the like.

A sensor system (e.g., one or more of the plurality of sensor systems 102-104) may comprise multiple sensors. For example, the first sensor system 102 may comprise a first sensor, a second sensor, etc. Furthermore, some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

The autonomous vehicle 100 further includes several mechanical systems that are used to effectuate appropriate motion of the autonomous vehicle 100. For instance, the mechanical systems can include but are not limited to, a vehicle propulsion system 106, a braking system 108, and a steering system 110. The vehicle propulsion system 106 may include an electric motor, an internal combustion engine, or both. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises a signal fusion system 118 that is configured to output a fused directive by merging information generated according to a plurality of techniques, wherein the information corresponds to an object captured in at least one sensor signal provided by at least one sensor system 102-104. The memory 116 additionally includes a control system 120 that is configured to receive the fused directive output by the signal fusion system 118 and is further configured to control at least one of the mechanical systems (e.g., the vehicle propulsion system 106, the brake system 108, and/or the steering system 110) based upon the output of the signal fusion system 118.

Figure 2:
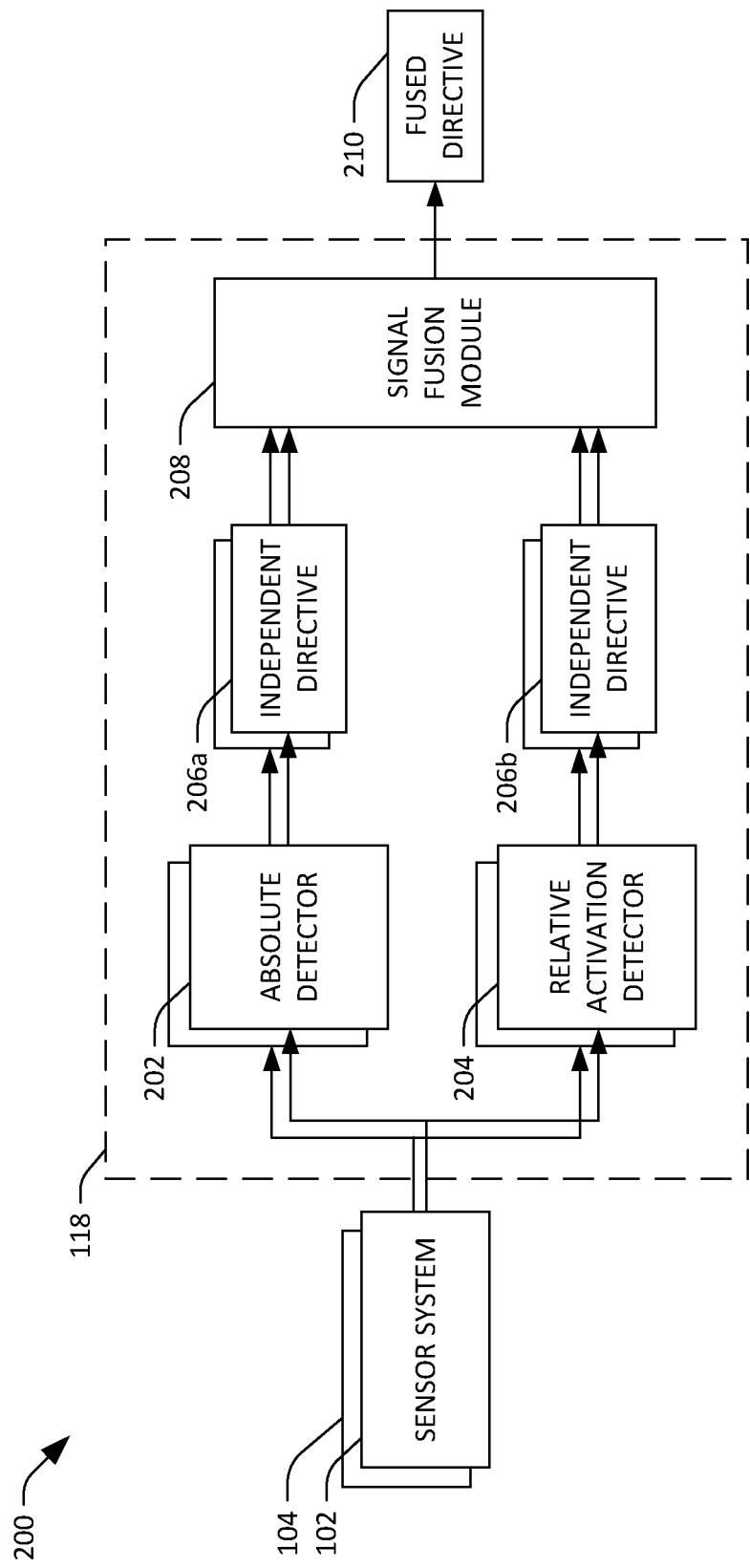
FIG. 2 illustrates an exemplary architecture that incorporates a signal fusion system.

With reference now to FIG. 2, an architecture 200 is illustrated that includes the signal fusion system 118 which outputs a fused directive 210 based on at least one sensor signal provided by the sensor systems 102-104. The sensor systems 102-104 may include a plurality of camera sensor systems that provides a first sensor signal and a second sensor signal to the signal fusion system 118. For instance, a first camera sensor system can include a fixed exposure camera and a second camera sensor system can include an autoexposure camera. In an exemplary embodiment, the sensor systems 102-104 may be configured so that each of the plurality of camera sensor systems is adapted to identify a particular characteristic of an object. For example, a first camera sensor system may provide a first sensor signal that generates gray scale information to capture a shape of an object (e.g., left turning arrow) and a second camera sensor system may provide a second sensor signal that captures a color of the object (e.g., green). Thus, when the two signals are fused, a left-green turning arrow is identified by the signal fusion module 208 to generate the fused directive 210. In addition, the autonomous vehicle 100 may include separate sensor systems 102-104 that each capture a specific color of an object (e.g., green, yellow, or red).

A conventional camera sensor system of an autonomous vehicle 100 can have a viewing range on the order of sixty degrees. However, the incorporation of additional cameras to the autonomous vehicle 100 can increase the viewing range of the sensor system 102 to one-hundred eighty degrees and beyond, if desirable. The plurality of sensor systems 102-104 can include camera sensor systems such as general-purpose cameras (fixed exposure) and HDR cameras (autoexposure). Thus, the signal fusion system 118 is a multimodal system configured to generate a directive based on a plurality of inputs.

The signal fusion system 118 further comprises a plurality of object detector modules 202-204 that include at least a first type of module and a second type of module to provide multiple object detection techniques for a same object captured in at least one sensor signal. In an exemplary embodiment, the first type of module is an absolute detector 202 and the second type of module is a relative activation detector 204. In the context of traffic light detection, an absolute detector module 202 detects a kind of bulb that is illuminated (e.g., red circle) to generate a directive for controlling the autonomous vehicle 100. In contrast, the relative activation detector module 204 generates a directive for the autonomous vehicle 100 by determining the configuration of a traffic light based on inferences about the layout of the light. For example, if the top position of a three-bulb vertical traffic light is illuminated, the relative activation detector 204 may infer a "solid red circle" based on predefined layouts incorporated in the memory 116 to generate an independent directive of "STOP".

The predefined layouts are selected by the object detector modules 202-204 based on a taxonomy that begins at a top level with a conventional traffic light (e.g., a three-bulb, vertically aligned, red-yellow-green light) and branches down through configurations having increasing levels of granularity. For example, if the detected traffic light can be identified more narrowly than the configuration that corresponds to the level above it, the object detector modules 202-204 continue to distinguish the traffic light at further levels of granularity in the taxonomy, such as by differentiating between red-yellow-green-green arrow traffic lights and red-yellow-green-red arrow traffic lights. This process is conducted via a convolution neural network until an illuminated configuration of the traffic light is paired with the most granular predefined layout that it can be matched to in a database of layouts.

Each type of object detector module (e.g., absolute detector module 202 and relative activation detector module 204) generates an independent directive for each sensor signal provided by the sensor systems 102-104; the absolute detector module 202 generates independent directives 206a and the relative activation detector module 204 generates independent directives 206b (the independent directives 206a and the independent directives 206b are collectively referred to herein as independent directives 206). Each of the independent directives 206 define a (pre-fusion) vehicle maneuver based on the state of illumination detected by the object detector modules 202-204 according to the predefined layouts. The independent directives 206 may be fused at the object detector/bulb level by the plurality of object detector modules 202-204 when a same object detector module generates a same independent directive 206 for a same sensor signal. Otherwise, the plurality of independent directives 206 are provided to the signal fusion module 208 where the independent directives 206 are thereby merged/fused.

Each independent directive 206 provided to the signal fusion module 208 defines a vehicle maneuver that corresponds to the observed state of the traffic light. The fusion module 208 then applies confidence scores to the observations captured in the sensor signal(s) to determine the accuracy of the detected traffic light layout and illuminated configuration thereof. For instance, a first independent directive may correspond to a solid red circle, whereas a second independent directive may correspond to a flashing red circle. The signal fusion module 208 fuses the first and second independent directives to output a fused directive 210 that defines a vehicle maneuver based on the illuminated state of the traffic light, as determined by the signal fusion module 208 according to confidence scores applied to the independent directives that were based on identification of a solid red circle and a flashing red circle.

Figure 3:
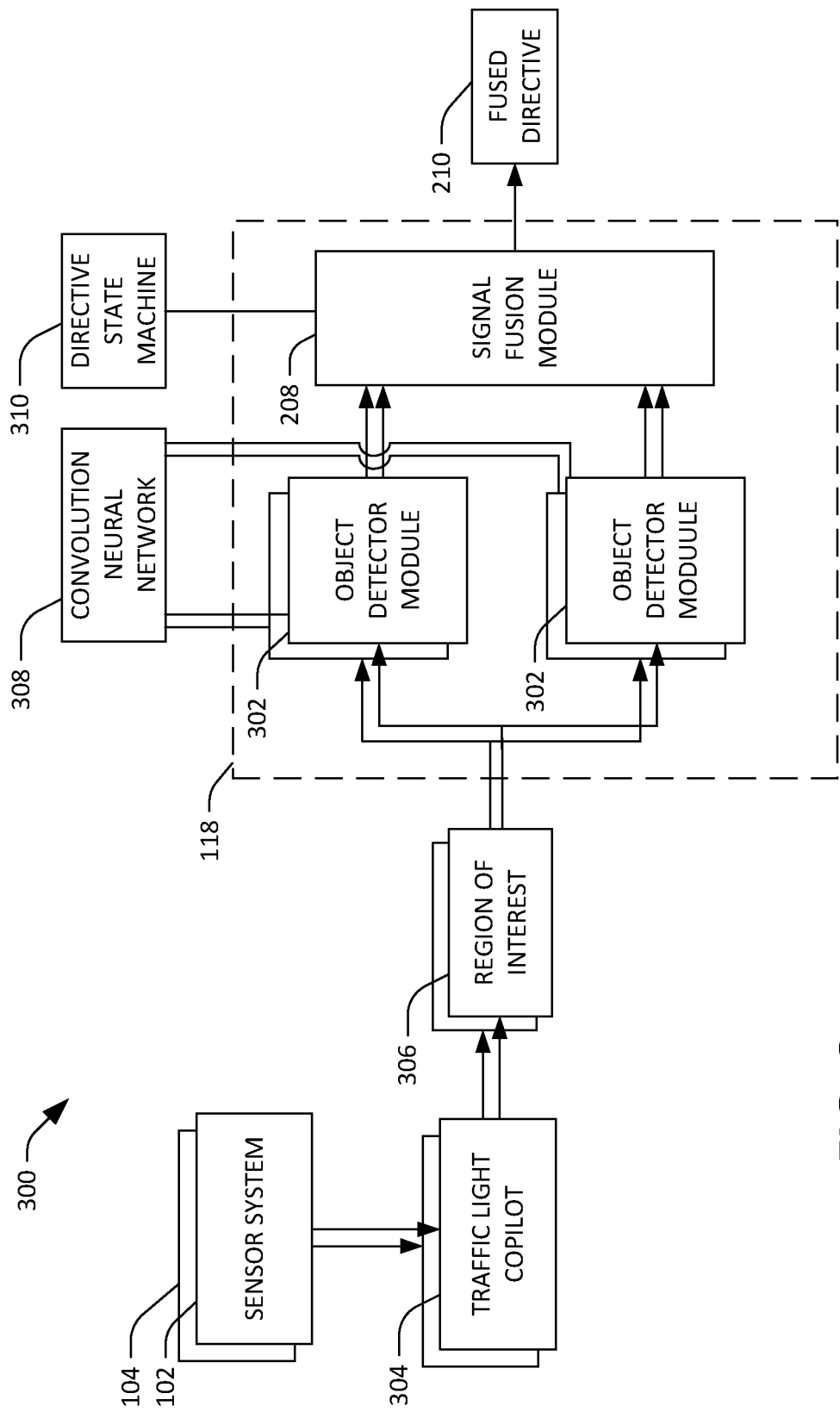
FIG. 3 illustrates an exemplary architecture that incorporates a signal fusion system.

Referring now to FIG. 3, an architecture 300 incorporating the signal fusion system 118 is illustrated. The architecture 300 includes a traffic light copilot 304 and a region of interest module 306 disposed in signal communication between the sensor systems 102-104 and the signal fusion system 118. In other embodiments the region of interest module 306 may be incorporated within the traffic light copilot 304. Accordingly, the architecture 300 includes nodes at the traffic light copilot 304, the object detector modules 302, and the signal fusion module 208. The traffic light copilot 304 defines a geometric projection that identifies where an object, such as a traffic light, is positioned relative to the sensor systems 102-104 of the autonomous vehicle 100. The output of the traffic light copilot 304 is provided to the region of interest module 306 to define a region of interest around a light source captured in the sensor signal of an image sensor system. In an exemplary embodiment, the region of interest comprises dimensions that are considerably larger than a traffic light (e.g., the region of interest may correspond to a height of 3 meters when defined around a traffic light having a height of 1 meter).

Additionally included in the architecture 300 is a convolution neural network 308 and a directive state machine 310. The convolution neural network 308 is linked to the object detector modules 302 to identify objects/configurations in the region of interest that is defined by the region of interest module 306. In an exemplary embodiment, a plurality of convolutional neural networks 308 can be running on a same image sensor signal to detect a plurality of objects/configurations captured in the sensor signal.

The directive state machine 310 is in communication with the signal fusion module 208 and is configured to define at least eight universal directives including: STOP (red light), STOP_AND_YIELD (flashing red light), MAYBE_STOP (yellow light), YIELD (flashing yellow light), ABOUT_TO_GO (light will soon turn green—transition directive in some countries), GO (green light), GO_PROTECTED (proceed through), and UNKNOWN (no detected light). A directive defines the most suitable course of action that an autonomous vehicle 100 should perform according to the configuration of the traffic light/lane and the applicable laws of the region. For instance, it is permissible for an autonomous vehicle 100 to exit an intersection on a solid red light (GO_PROTECTED) but it is not permissible for the autonomous vehicle 100 to enter the intersection on a solid red light without stopping. As such, the latter circumstance would be in contrast with the former circumstance, wherein the latter circumstance corresponds to a directive of STOP or, in states that allow vehicles to make a right-on-red, a directive of STOP_AND_YIELD.

Figure 4:
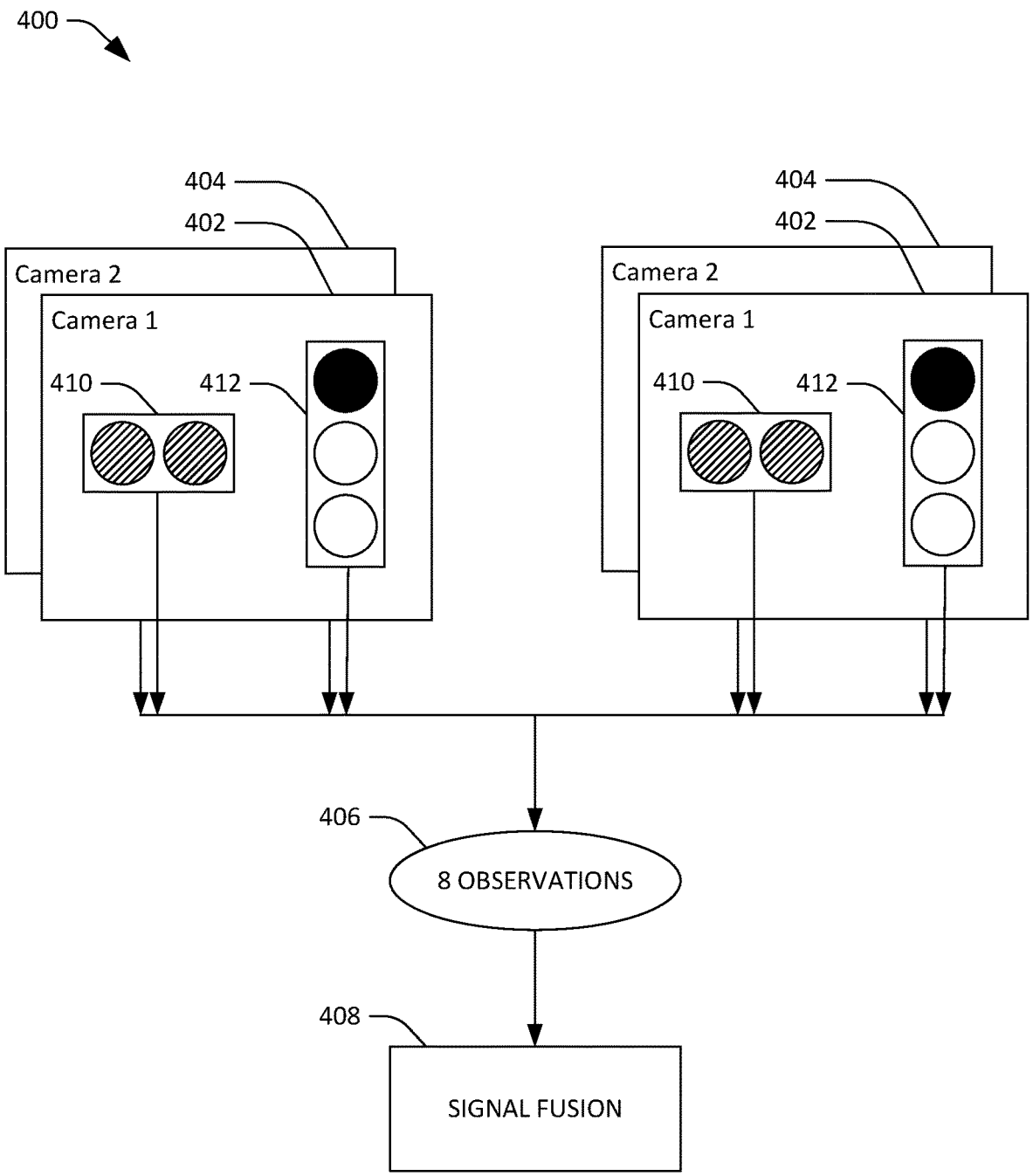
FIG. 4 is a flow diagram illustrating an exemplary signal fusion process.

Referring now to FIG. 4, a flow diagram 400 of an exemplary signal fusion process is illustrated. The flow diagram 400 includes sensor signals/images 402-404 generated by a first camera and a second camera that capture a solid red light 412 disposed next to an alternating flashing red light 410, such as a combination of traffic lights that may be found at a railroad crossing. The first image 402 corresponding to the first camera may be generated by a fixed exposure camera and the second image 404 corresponding to the second camera may be generated by an autoexposure camera. Each set of images 402-404 captures the pair of traffic lights 410-412 and is processed by executing instructions on object detector modules of different types (e.g., an absolute detector module and a relative activation detector module) to generate eight observations 406 that correspond to eight independent directives (i.e., two observations per image, times two images, times two types of object detector modules).

In the exemplary images 402-404, a traffic light copilot 304 detects that the same two light emitting sources are captured in a sensor signal of the first camera and a sensor signal of the second camera. Accordingly, the traffic light copilot 304 generates corresponding signals for the region of interest module 306 to define regions of interest around each of the two light emitting sources captured in the sensor signals. The regions of interest are configured to circumscribe each of the light emitting sources as oversized boxes in comparison to the expected size of a traffic light, so that if the light emitting source is determined to correspond to a traffic light, the traffic light will be fully confined within the region of interest. That is, if the regions of interest were configured to be the same size as a conventional traffic light, it is possible that some bulbs of the traffic light would fall outside the region of interest when the region of interest module 306 centralized the light emitting source within a region of interest box. This would be especially apparent when the light emitting source is associated with less common traffic light layouts and configurations.

The images 402-404 are processed by a plurality of object detector modules via a convolution neural network 308 that identifies configurations of the light emitting sources in the regions of interest. In the exemplary images 402-404, a solid red light 412 and an alternating flashing red light 410 are detected by the convolution neural network 308, which provides corresponding signals to the object detector modules. The object detector modules generate an independent directive for each traffic light captured in each image provided to each object detector module, thereby accumulating eight observations 406 that form the basis of signal fusion 408.

If the detected traffic signals are correctly determined by the object detector modules, four of the independent directives would correspond to an alternating flashing red light 410 (STOP_AND_YIELD) and four of the independent directives would correspond to a solid red light 412 (STOP). If one of the cameras or object detector modules generates a signal that incorrectly identifies one of the lights 410-412, a third type of independent directive would be generated. All of the independent directives are merged by signal fusion 408 using probabilistic techniques based on confidence scores. In the embodiment described above, merging four STOP_AND_YIELD directives with four STOP directives would result in a fused directive of STOP, which is output to the control system of the autonomous vehicle for manipulating operation thereof.

Figure 5:
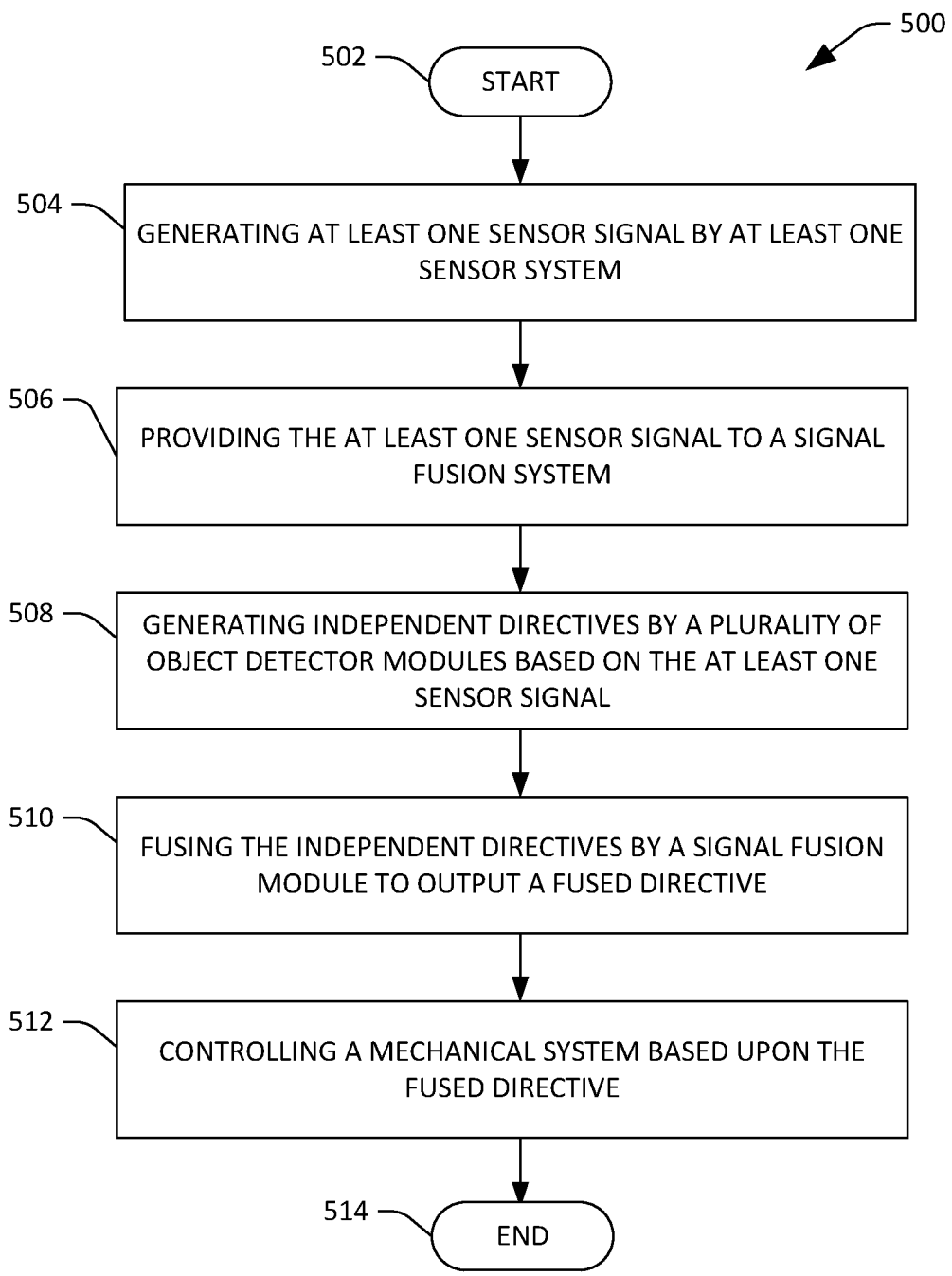
FIG. 5 is a flow diagram illustrating an exemplary methodology for a multimodal multi-technique signal fusion system.
Figure 6:
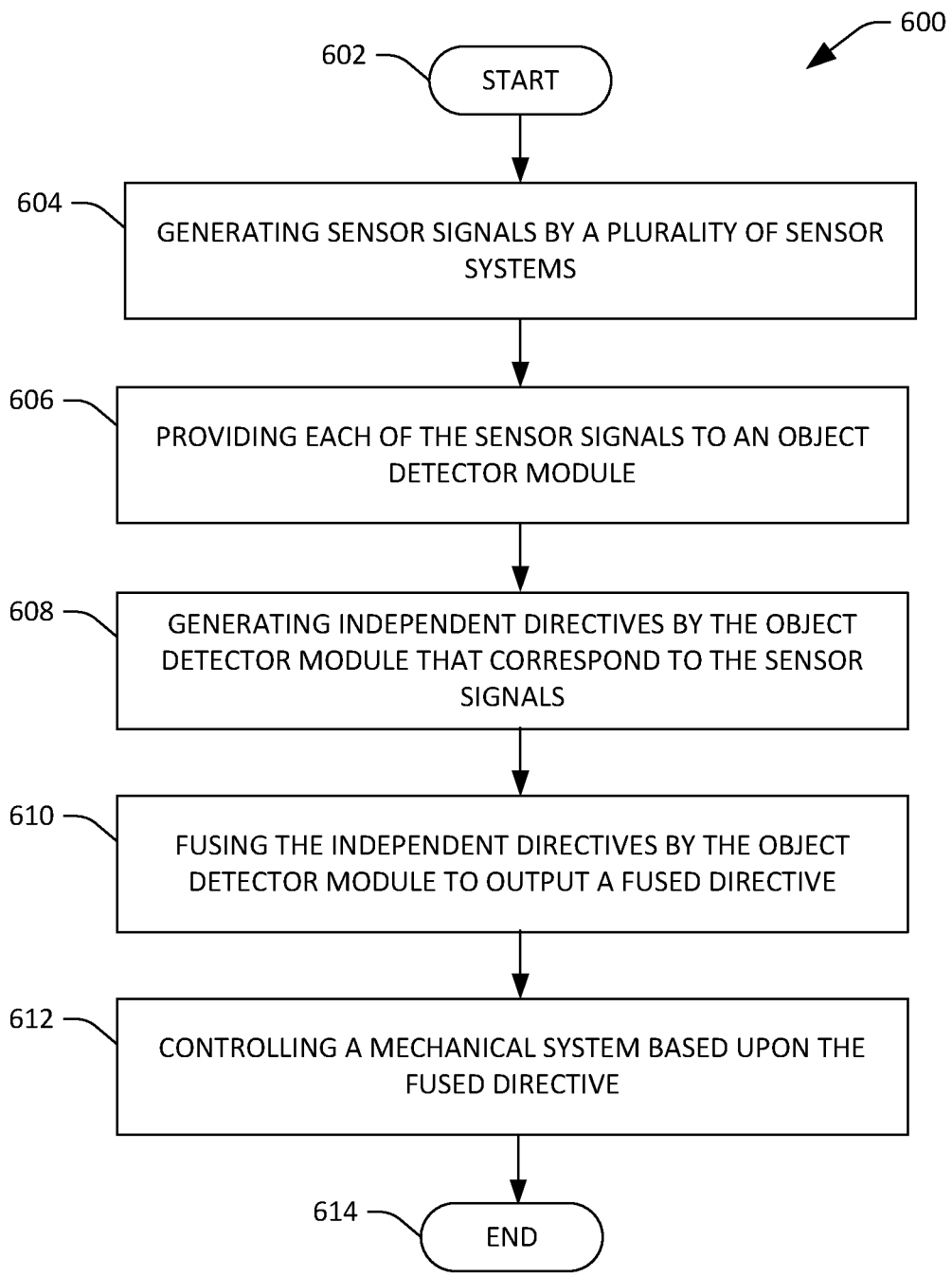
FIG. 6 is a flow diagram illustrating an exemplary methodology for a multimodal bulb-detector level signal fusion system.

FIGS. 5 and 6 illustrate exemplary methodologies relating to a multimodal multi-technique signal fusion system for an autonomous vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for a multimodal multi-technique signal fusion system for an autonomous vehicle is illustrated. The methodology 500 starts at 502, and at 504 at least one sensor signal is generated by at least one sensor system. The at least one sensor signal captures the configuration of an object, such as an illuminated state of a traffic light. The at least one sensor system may be an image sensor system, an infrared sensor system, or any other type of sensor system that is suitable for detecting an illuminated bulb of a traffic light.

At 506, the at least one sensor signal is provided to a signal fusion system, wherein the signal fusion system includes a plurality of object detector modules in communication with a signal fusion module. At 508, each of the plurality of object detector modules receive the at least one sensor signal and thereby generate independent directives based on the at least one sensor signal, wherein the independent directives define a traffic maneuver to be performed by the autonomous vehicle. At 510, the signal fusion module fuses the independent directives to output a fused directive. The independent directives are fused into a fused directive according to a probabilistic technique that assigns confidence scores to each of the independent directives. The fused directive is provided to a control system and defines instructions to be executed for controlling the autonomous vehicle. At 512, the control system of the autonomous vehicle controls a mechanical system, such as a vehicle propulsion system, a braking system, and/or a steering system, based on the fused directive. The methodology completes at 514.

Referring now to FIG. 6, an exemplary methodology 600 for a multimodal bulb-detector level signal fusion system is illustrated. The methodology 600 starts at 602, and at 604 sensor signals are generated by a plurality of sensor systems. The sensor signals capture the configuration of an object, such as an illuminated state of a traffic light. The plurality of sensor systems may include one or more image sensor systems, infrared sensor systems, or any other type of sensor systems that are suitable for detecting an illuminated bulb of a traffic light.

At 606, each of the sensor signals are provided to an object detector module in communication with each of the plurality of sensor systems. At 608, independent directives are generated by the object detector module that correspond to the sensor signals, wherein the independent directives define a maneuver to be performed by the autonomous vehicle. At 610, the object detector module fuses the independent directives to output a fused directive. The independent directives are fused into a fused directive according to a probabilistic technique by the object detector module. The fused directive is provided to a control system and defines instructions to be executed for controlling the autonomous vehicle. At 612, the control system of the autonomous vehicle controls a mechanical system, such as a vehicle propulsion system, a braking system, and/or a steering system, based on the fused directive. The methodology completes at 614.

Figure 7:
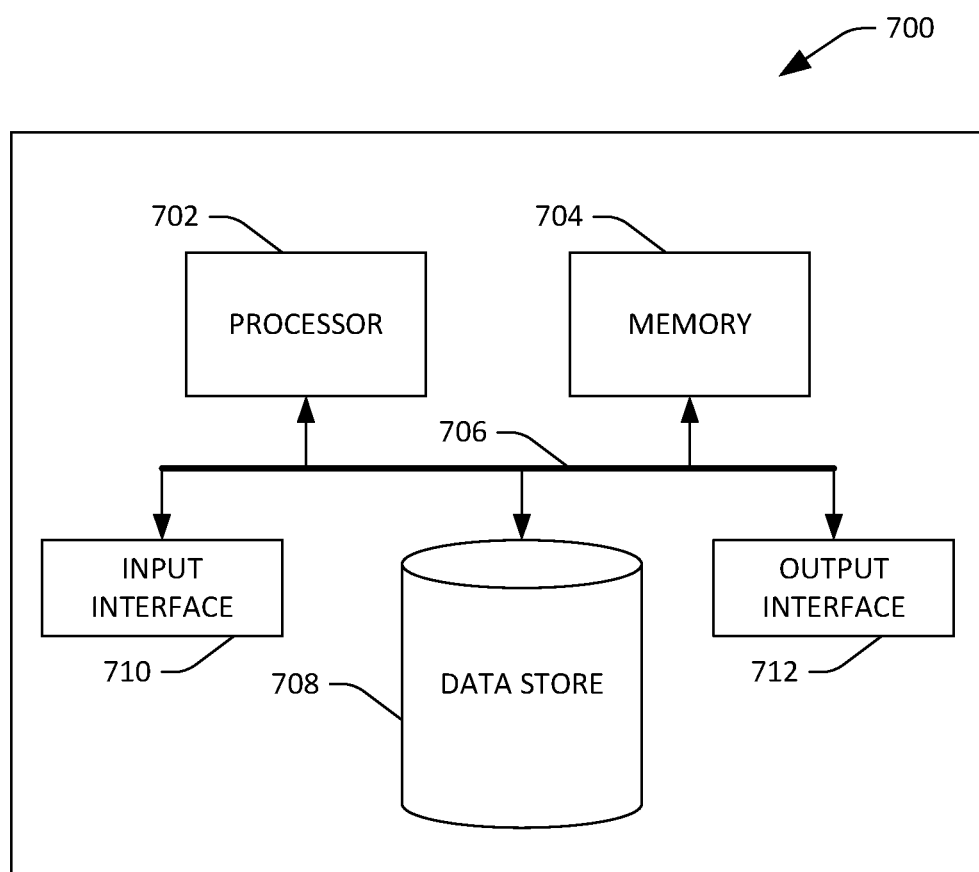
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 112. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. In addition to storing executable instructions, the memory 704 may also store location information, distance information, direction information, etc.

The computing device 700 additionally includes a data store 708 that is accessible by the processor 702 by way of the system bus 706. The data store 708 may include executable instructions, location information, distance information, direction information, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle, comprising:
    a mechanical system;
    at least one sensor system, comprising:
        a fixed exposure camera system configured to output a first sensor signal; and
        an auto exposure camera system configured to output a second sensor signal;
    a computing system in communication with the mechanical system and the at least one sensor system, wherein the computing system comprises:
        a processor; and
        memory that stores instructions that, when executed by the processor, cause the processor to perform acts comprising:
            generating a first independent directive and a second independent directive that each define a vehicle maneuver based upon an illuminated configuration of a traffic light captured in the first sensor signal and the second sensor signal;
            fusing the first independent directive and the second independent directive to output a fused directive; and
            controlling the mechanical system based upon the fused directive.

2. The autonomous vehicle of claim 1, wherein the first independent directive and the second independent directive are generated by a plurality of object detectors that receive the first sensor signal and the second sensor signal from the at least one sensor system.

3. The autonomous vehicle of claim 2, wherein one of the first sensor signal or the second sensor signal captures a shape of an object and the other one of the first sensor signal or the second sensor signal captures a color of the object.

4. The autonomous vehicle of claim 2, wherein the plurality of object detectors includes an absolute detector to generate the first independent directive and a relative activation detector to generate the second independent directive.

5. The autonomous vehicle of claim 2, wherein the first independent directive and the second independent directive are fused by the plurality of object detectors when the first independent directive and the second independent directive are a same directive output by a same type of object detector.

6. The autonomous vehicle of claim 1, wherein the memory further stores instructions, that when executed by the processor, cause the processor to perform acts comprising:
    determining, utilizing a convolution neural network, the illuminated configuration of the traffic light, the illuminated configuration of the traffic light being one of a number of predefined traffic light layout configurations.

7. The autonomous vehicle of claim 1, wherein the first independent directive and the second independent directive are fused to generate the fused directive based upon a confidence score.

8. The autonomous vehicle of claim 7, wherein the fused directive defines a post-fusion vehicle maneuver based upon confirmation of the illuminated configuration of the traffic light.

9. A method performed by an autonomous vehicle, the method comprising:
    generating a first sensor signal and a second sensor signal, wherein the first sensor signal is generated by a fixed exposure camera system of the autonomous vehicle and the second sensor signal is generated by an auto exposure camera system of the autonomous vehicle;
    generating a first independent directive and a second independent directive that each define a vehicle maneuver based upon an illuminated configuration of a traffic light captured in the first sensor signal and the second sensor signal;
    fusing the first independent directive and the second independent directive to output a fused directive; and
    controlling a mechanical system of the autonomous vehicle based upon the fused directive.

10. The method of claim 9, further comprising generating the first independent directive and the second independent directive by a plurality of object detectors that receive the first sensor signal and the second sensor signal from the fixed exposure camera system and the auto exposure camera system.

11. The method of claim 10, further comprising fusing the first independent directive and the second independent directive when the first independent directive and the second independent directive are a same directive output by a same type of object detector.

12. The method of claim 9, further comprising generating the first independent directive by an absolute detector and the second independent directive by a relative activation detector.

13. The method of claim 9, further comprising determining the illuminated configuration of the traffic light utilizing a convolution neural network, the illuminated configuration of the traffic light being one of a number of predefined traffic light layout configurations.

14. The method of claim 9, further comprising fusing the first independent directive and the second directive to generate the fused directive based upon a confidence score.

15. An autonomous vehicle, comprising:
a mechanical system;
at least one sensor system configured to output a first sensor signal and a second sensor signal, wherein the first sensor signal captures a shape of an object and a second sensor signal captures a color of the object;
a computing system in communication with the mechanical system and the at least one sensor system, wherein the computing system comprises:
a processor; and
memory that stores instructions that, when executed by the processor, cause the processor to perform acts comprising:
generating a first independent directive and a second independent directive that each define a vehicle maneuver based upon an illuminated configuration of a traffic light captured in the first sensor signal and the second sensor signal;
fusing the first independent directive and the second independent directive to output a fused directive; and
controlling the mechanical system based upon the fused directive.

16. The autonomous vehicle of claim 15, wherein the first independent directive and the second independent directive are generated by a plurality of object detectors that receive the first sensor signal and the second sensor signal from the at least one sensor system.

17. The autonomous vehicle of claim 16, wherein the plurality of object detectors includes an absolute detector to generate the first independent directive and a relative activation detector to generate the second independent directive.

18. The autonomous vehicle of claim 15, wherein a first camera system outputs the first sensor signal and a second camera system outputs the second sensor signal.

19. The autonomous vehicle of claim 15, wherein the at least one sensor system comprises a fixed exposure camera and an auto exposure camera.

20. The autonomous vehicle of claim 15, wherein the memory further stores instructions, that when executed by the processor, cause the processor to perform acts comprising:
determining, utilizing a convolution neural network, the illuminated configuration of the traffic light, the illuminated configuration of the traffic light being one of a number of predefined traffic light layout configurations.

* * * * *